(12) United States Patent
Arai et al.

(10) Patent No.: US 6,188,584 B1
(45) Date of Patent: Feb. 13, 2001

(54) POWER SUPPLY CIRCUIT MAINTAINING ELECTRICAL ISOLATION

(75) Inventors: Tsutomu Arai, Tokyo; Hiroshi Shinobu, Chiba, both of (JP)

(73) Assignee: Sony Corporation, Tokyo (JP)

( * ) Notice: Under 35 U.S.C. 154(b), the term of this patent shall be extended for 0 days.

(21) Appl. No.: 09/456,282

(22) Filed: Dec. 7, 1999

(30) Foreign Application Priority Data

Dec. 9, 1998 (JP) .................................................. 10-350408

(51) Int. Cl.[7] .......................... H02M 3/335; H02M 7/537; H02H 7/122
(52) U.S. Cl. ............................. 363/16; 363/56; 363/131; 323/902
(58) Field of Search .................................. 363/15, 16, 55, 363/56, 95, 97, 131; 323/902

(56) References Cited

U.S. PATENT DOCUMENTS

| | | | |
|---|---|---|---|
| 4,595,977 | * 6/1986 | von der Ohe | 363/56 |
| 5,341,179 | * 8/1994 | Konishi | 363/21 |
| 5,917,713 | * 6/1999 | Highuchi | 363/95 |
| 5,995,388 | * 11/1999 | Preller | 363/21 |

* cited by examiner

Primary Examiner—Peter S. Wong
Assistant Examiner—Bao Q. Vu
(74) Attorney, Agent, or Firm—Frommer Lawrence & Haug, LLP.; William S. Frommer; Gordon Kessler

(57) ABSTRACT

A power supply circuit including a first rectifying smoother for generating a DC output when connected to an AC power source. A standby power source that provides a plurality of DC outputs when supplied with the DC output from the first rectifying smoother. A second rectifying smoother converts the AC input into a DC output, which is converted by the main power source into a desired DC voltage. On the primary side of the main and standby power source, a relay controller, supplied with power by one of the DC outputs from the standby power source, responds to an actuation of a main switch. A relay switch connects the AC power source to the second rectifying smoother upon actuation of the relay controller. The standby power source also supplies power to the control means, which is disposed on the secondary side of the main and standby power source.

7 Claims, 3 Drawing Sheets

POWER SUPPLY CIRCUIT MAINTAINING ELECTRICAL ISOLATION

BACKGROUND OF THE INVENTION

1. Field of the Invention

The present invention relates to a power supply circuit for use in an electronic apparatus such as a video projector or a television receiver.

2. Description of the Prior Art

Recently in an electronic apparatus such as a video projector, a television receiver and so forth for projecting image, there is employed a system which, even when a main power source thereof is placed in its off-state, enables a user to close the main power source again by turning on a main power switch of the apparatus by means of a remote controller or the like.

The power supply circuit of this type known heretofore has such a circuit configuration as that shown in FIG. 3. The power supply circuit shown in FIG. 3 has a power plug 1000, a primary circuit 1001 and a secondary circuit 1002. The power plug 1000 is capable of inserting into, e.g., an outlet of a commercial AC power source for supplying an AC input voltage. The power plug 1000 is connected to a relay switch 1003, a rectifier diode bridge 1004 and so forth in the primary circuit 1001 of transformers 1020 and 1021. The rectifier diode bridge 1004 is connected to a main switching power circuit 1005. Power is supplied to a standby switching power circuit 1006 from a half-wave rectifier circuit consisting of a diode 1031 and a capacitor 1032.

The secondary circuit 1002 of the transformers 1020 and 1021 is equipped with a relay controller 1007 and a microcomputer 1009 for turning on or off the relay switch 1003. The relay switch 1003 is disposed in the primary circuit 1001 relative to the main switching power circuit 1005 and the standby switching power circuit 1006. Meanwhile a relay control coil 1008 is disposed in the secondary circuit 1002 relative to the main switching power circuit 1005 and the standby switching power circuit 1006.

In the known power supply circuit of FIG. 3 mentioned above, it is necessary to dispose the secondary coil, the rectifier and the regulator of the standby switching power circuit 1006 on the side of the secondary circuit 1002 side, and also to dispose the relay control coil 1008 and the power switch 1010 on the same side for turning on the main switching power circuit 1005, and further to dispose the relay switch 1003 and the main switching power circuit 1005 in the primary circuit 1001. When the power switch 1010 is turned on in a state where an on-control signal from the microcomputer 1009 is applied to the base of a transistor 1030, then the transistor 1030 is switched on to cause a current flow in the relay control coil 1008, thereby turning on the relay switch 1003. Consequently, the main switching power circuit 1005 is driven to deliver a desired main power output 1011.

Since the relay switch 1003 and the relay control coil 1008 are housed normally in one casing, the secondary circuit 1002 including the relay control coil 1008 is so positioned as to be proximate to the primary circuit 1001 with partial entry.

However, in view of conforming with required safety standards, a certain electrical insulation distance needs to be insured between the primary circuit 1001 and the secondary circuit 1002.

For this reason, it is necessary to space the primary circuit structure and the secondary circuit structure apart from each other by increasing the area of a substrate where the primary circuit 1001 including the relay switch 1003 and the secondary circuit 1002 including the relay controller 1007 are formed.

Similarly in view of conforming with the required safety standards, the level of any spurious radiation noise generated in the electronic apparatus and leaking via its power cord needs to be reduced under a predetermined value. In preventing harmful influence of such spurious radiation noise generated from the secondary circuit 1002 and induced to the primary circuit 1001, there exists a problem of necessitating increase of the substrate area to reduce the leakage level of the spurious radiation noise from the secondary circuit 1002 to the primary circuit 1001.

SUMMARY OF THE INVENTION

It is therefore an object of the present invention to provide a power supply circuit which is adapted for curtailing the area of a circuit substrate and reducing any spurious radiation from a secondary circuit to a primary circuit while insuring a proper electrical insulation distance between the secondary and primary circuits.

According to one aspect of the present invention, there is provided a power supply circuit for converting an AC voltage of an input AC power into a desired DC output voltage. This power supply circuit comprises a first rectifying smoother for generating a DC voltage from the AC power supplied thereto; a standby power source supplied with the DC voltage from the first rectifying smoother and having a plurality of DC outputs; a second rectifying smoother for converting the AC voltage into a DC voltage; a main power source for converting the DC voltage of the second rectifying smoother into the desired DC output voltage; a main switch for turning on the main power source; a relay controller disposed on the primary side of the main power source and the standby power source and, in response to turn-on of the main switch, actuated by the first of the plural DC outputs obtained from the standby power source; and a relay switch disposed on the primary side of the main power source and the standby power source and, upon actuation of the relay controller, driven to connect the second rectifying smoother to the AC power source.

Since the relay controller and the relay switch are both disposed on the primary side of the main power source and the standby power source, the relay controller and the relay switch are positionally in mutual proximity, but the primary side of the main and standby power sources is not proximate to the secondary side of the main and standby power sources without the necessity of any particular portion for electromagnetic insulation, whereby the substrate area can be curtailed. Moreover, this structure is effective to reduce the leakage level of any spurious radiation noise from the relay controller to the relay switch.

The above power supply circuit further comprises a control means disposed on the secondary side of the main power source and the standby power source, and fed with an input signal which indicates an on-state or an off-state of the main switch, wherein the standby power source supplies the second of the plural DC outputs as a voltage for actuating the control means.

In this instance, the standby power source can supply the voltage for actuating to the control means.

The power supply circuit mentioned above further comprises a first optical switch for transmitting the signal, which indicates the on/off state of the main switch, to the control means, wherein the first optical switch consists of a light emitting element and a light receiving element to receive the light from the light emitting element, and the first optical switch is an electromagnetically insulating element disposed between the primary side of the main and standby power sources and the secondary side of the main and standby power sources.

Thus, electromagnetic insulation can be achieved between the primary side and the secondary side of the main and standby power sources.

In the power supply circuit mentioned above, the relay controller has a relay control coil, wherein the relay controller receives a control signal from the control means, and when the main switch is turned on, the relay controller operates the relay control coil thereof to turn on the relay switch.

Also in the power supply circuit mentioned above, the relay controller has a second optical switch turned on by the control signal from the control means, wherein the second optical switch consists of a light emitting element and a light receiving element to receive the light from the light emitting element; and the second optical switch is an electromagnetically insulating element disposed between the primary side of the main and standby power sources and the secondary side of the main and standby power sources.

Further in the power supply circuit mentioned above, the control means has an input terminal to detect the DC output voltage of the main power source, and has a function of discriminating between the presence and absence of the DC output voltage of the main power source, thereby making a decision as to whether the operation of the main power source is normal or not.

According to the present invention as described above, it becomes possible to curtail the area of the circuit substrate and also to reduce any spurious radiation from the secondary circuit to the primary circuit.

The above and other features and advantages of the present invention will become apparent from the following description which will be given with reference to the illustrative accompanying drawings.

DETAILED DESCRIPTION OF THE PREFERRED EMBODIMENTS

Hereinafter some preferred embodiments of the present invention will be described in detail with reference to the accompanying drawings, wherein like component elements are denoted by like or similar numerals.

Since the following embodiments are merely preferred concrete examples of the present invention, some technically preferred restrictions are given thereto. However, it is to be understood that the scope of the present invention is not limited to such embodiments alone unless otherwise specified in the following description.

Figure 1:
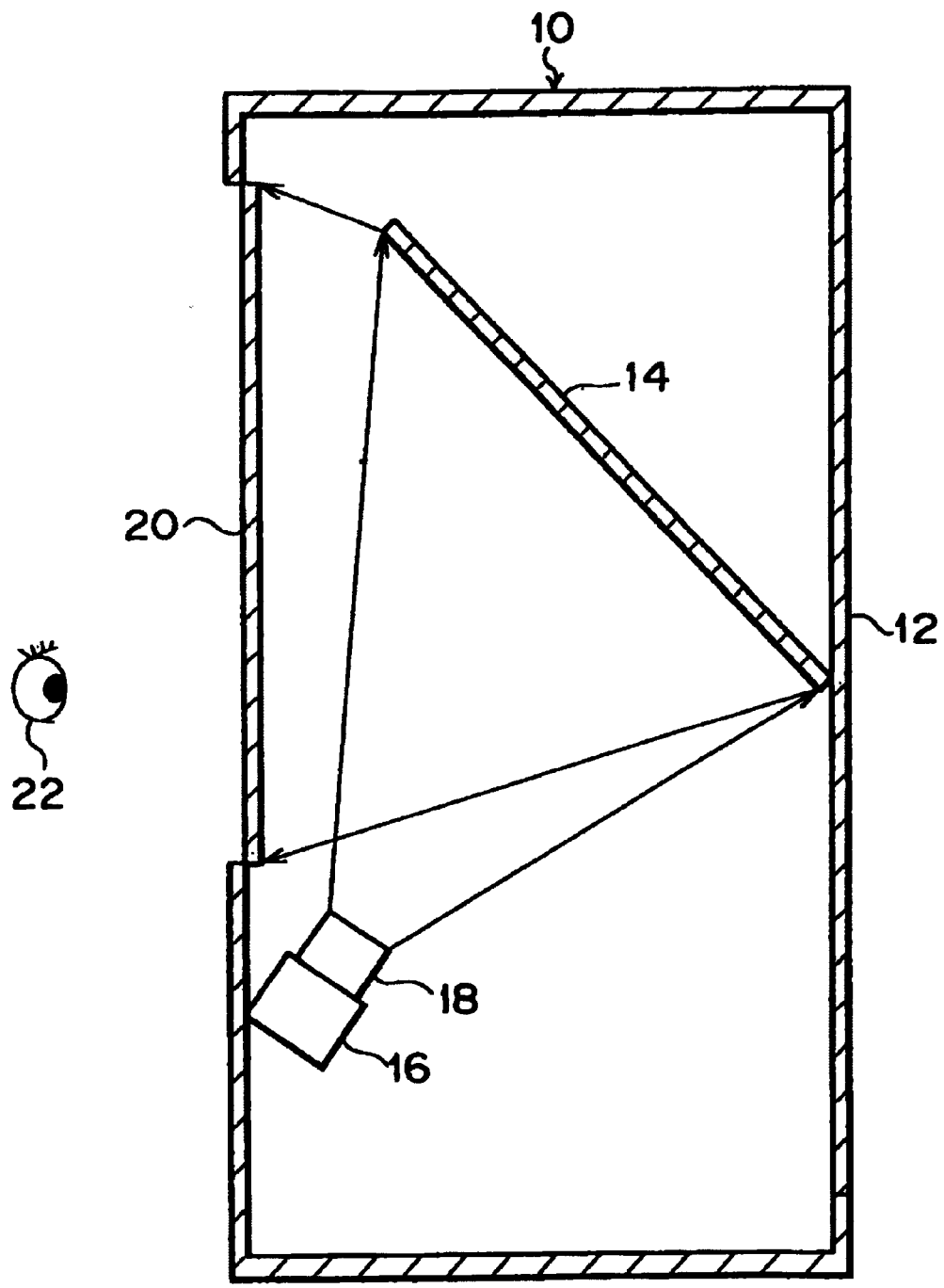
FIG. 1 shows an exemplary projector equipped with a preferred embodiment representing the power supply circuit of the present invention.

FIG. 1 shows a rear projector as an exemplary electronic apparatus equipped with a preferred embodiment of the power supply circuit of the present invention. This projector 10 has a mirror 14, a projection unit 16 and so forth in its body 12. A color image for example emitted from the projection unit 16 is magnified through a lens 18 and then arrives at the mirror 14. The image is reflected by the mirror 14 and then is projected onto the inner plane of a screen 20 in the body 12, so that a viewer 22 can watch the image projected onto the back side of the screen 20.

Figure 2:
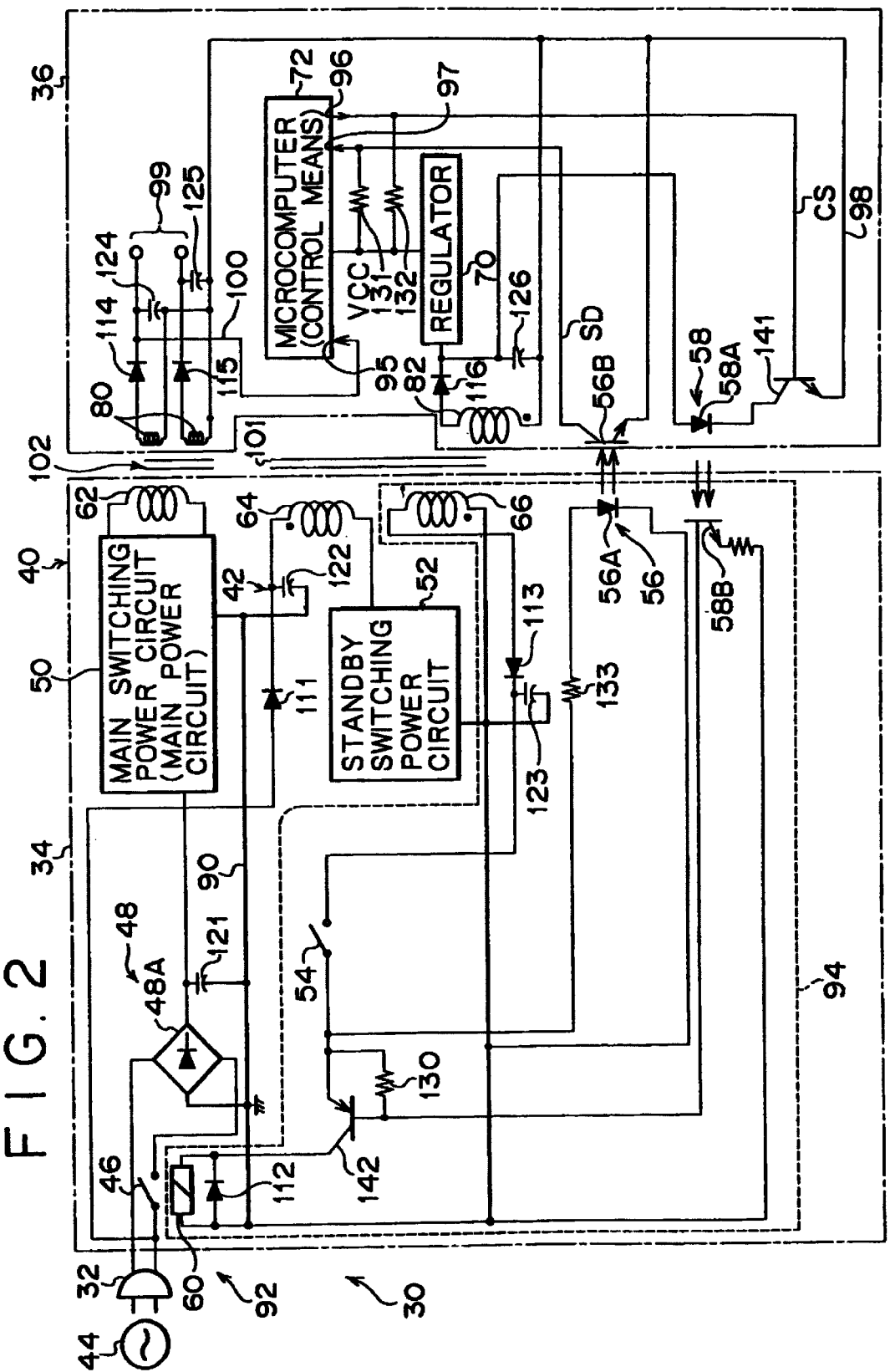
FIG. 2 is a circuit diagram of a preferred embodiment which represents the power supply circuit of the present invention.

FIG. 2 shows a preferred embodiment of the power supply circuit used in the projection unit 16 in FIG. 1. This power supply circuit 30 is capable of supplying a main power output 99 to a light source of the projection unit 16 or a liquid crystal panel (light bulb).

Schematically, the power supply circuit 30 has a power plug 32, a primary circuit 34, a secondary circuit 36 and so forth.

The primary circuit 34 denotes the primary side relative to a transformer 102 in a main power source 40 and also a portion relative to a primary winding 64 and a secondary winding 66 of a transformer 101 in a standby power source 42. The secondary circuit 36 denotes the secondary side relative to the transformer 102 in the main power source 40, and a portion relative to a second secondary winding 82 of the transformer 101 in the standby power source 42.

The power plug 32 is a type attachable to and detachable from a commercial AC power source 44, and is adapted to obtain therefrom a commercial AC voltage of 100 V for example.

The primary circuit 34 has a relay switch 46, a relay controller 94, a rectifying smoother (rectifier) 48, a main switching power circuit (main power circuit) 50, a diode 111, a capacitor 122, a standby switching power circuit 52, a power switch (main power switch) 54, a light emitting diode 56A of a photo coupler (first optical switch) 56, a transistor 142, a resistor 130, a photo transistor 58B of a photo coupler (second optical switch) 58, a diode 112, a relay control coil 60, primary coils 62 and 64, a secondary coil 66, a diode 113 and a capacitor 123. The primary circuit 34 is enclosed with a frame of one-dot chained line.

The secondary circuit 36 is enclosed with a frame of two-dot chained line. This circuit 36 has a photo transistor 56B of the photo coupler 56, a light emitting diode 58A of the photo coupler 58, a transistor 141, a regulator 70, a diode 116, a capacitor 126, resistors 131 and 132, a microcomputer 72 serving as control means, diodes 114 and 115, capacitors 124 and 125, and secondary coils 80 and 82.

In the primary circuit 34, the rectifying smoother 48 comprises a rectifying diode bridge 48A and a smoothing capacitor 121. One terminal of the power plug 32 is connected to one input terminal of the diode bridge 48A, while the other end of the power plug 32 is connected via the relay switch 46 to the other input terminal of the diode bridge 48A.

One output terminal of the rectifying diode bridge 48A and one terminal of the capacitor 121 are connected to an input terminal of the main switching power circuit 50. Meanwhile the other output terminal of the diode bridge 48A and the other terminal of the smoothing capacitor 121 are connected to a primary ground wire 90.

The junction of the other terminal of the power plug 32 and the relay switch 46 is connected via the diode 111 and the primary coil 64 to the output terminal of the standby switching power circuit 52. Further one terminal of the capacitor 122 is connected to the junction of the diode 111 and the primary coil 64, while the other terminal of the capacitor 122 is connected to the primary ground wire 90.

The relay switch 46 and the relay control coil 60 constitute a relay 92. The relay controller 94 of the primary circuit 34 is a control circuit for operating the main switching power circuit 50 by actuating the relay control coil 60 to turn on the relay switch 46.

The relay control coil 60 of the relay controller 94 is connected together with the diode 112 between the collector of the transistor 142 and the emitter of the photo transistor 58B of the photo coupler 58. The emitter of the transistor 142 is connected to one terminal of the secondary coil 66 via the power switch 54 and the diode 113, and the other terminal of the secondary coil 66 is connected to the primary ground wire 90. One terminal of the capacitor 123 is connected to the junction of the diode 113 and the power switch 54, while the other terminal of the capacitor 123 is connected to the primary ground wire 90. The anode of the light emitting diode 56A of the photo coupler 56 is connected to the emitter of the transistor 142 via a resistor 133, while the cathode of the light emitting diode 56A is connected to the primary ground wire 90. And a resistor 130 is connected between the emitter and base of the transistor 142.

The base of the transistor 142 is connected to the collector of the photo transistor 58B of the photo coupler 58.

In the secondary circuit 36, one terminal of the secondary coil 82 is connected to a secondary ground wire 98, while the other terminal of the secondary coil 82 is connected to a capacitor 126 whose one terminal is connected to the secondary ground wire 98 via diode 116. The junction of the diode 116 and the capacitor 126 is connected to the input terminal of the regulator 70, and a source voltage Vcc is supplied from the output terminal of the regulator 70 to the microcomputer 72.

A resistor 132 is connected between the control terminal 96 and the output terminal of the regulator 70, and a resistor 131 is connected between an on/off detection signal input terminal 97 of the power switch 54 and the output terminal of the regulator 70.

One terminal of the photo transistor 56B of the photo coupler 56 is connected to the detection signal input terminal 97 of the microcomputer, while the other terminal of the photo transistor 56B is connected to the secondary ground wire 98 of the photo transistor 56B.

The junction of the diode 116 and the capacitor 126 is connected to one terminal of the light emitting diode 58A of the photo coupler 58, and the other terminal of the light emitting diode 58A is connected to the collector of the transistor 141.

The base of the transistor 141 is connected to the control terminal 96 of the microcomputer 72, while the emitter of the transistor 141 is connected to the secondary ground wire 98.

The secondary coil 80 consists of two windings, wherein one end of each winding is connected to the secondary ground wire 98, while the other ends thereof are connected to the anodes of diodes 114 and 115, respectively.

The cathodes of the diodes 114 and 115 are connected, respectively, to the other ends of smoothing capacitors 124 and 125 each connected at one end thereof to the secondary ground wire, and then a main power output 99 (DC output voltage) is delivered therefrom.

The cathode of the diode 114 is connected to an output voltage detection input terminal 95 of the microcomputer 72 via a signal line 100.

The transformer 102 consists of a primary coil 62 and a secondary coil 80, and the transformer 101 consists of primary coil 64 and secondary coils 66, 82.

The feature of the power supply circuit 30 shown in FIG. 2 resides in that the relay switch 46 and the relay control coil 60 are both disposed in the primary circuit 34. The photo couplers 56 and 58 are electromagnetically insulating elements which serve as optical switches having a function of achieving electromagnetic insulation between the primary circuit 34 and the secondary circuit 36.

In response to the power switch on/off detection signal SD sent from the photo coupler 56 to the detection signal input terminal 97, the microcomputer 72 is capable of detecting whether the power switch 54 is in its on-state or off-state.

Subsequently the microcomputer 72 outputs a control signal CS from the control terminal 96 to the transistor 141.

In response to an information signal IS received at the output voltage detection terminal 95, the microcomputer 72 is capable of detecting whether the main power output 99 is being properly delivered or not via the signal line 100.

The power switch 54 is not connected directly to the power plug 32.

When the power plug 32 is connected to the commercial AC power source 44, the standby switching power circuit (standby power source) 52 and the microcomputer 72 are held in the normal operating state thereof.

Now an explanation will be given on an exemplary operation of the power supply circuit 30 in FIG. 2.

When the power plug (AC plug) 32 is connected to an outlet of the commercial AC power source 44, an AC power inputted via the power plug 32 is supplied to the first rectifying smoother consisting of the diode 111 and the capacitor 122, and then the smoothed DC output therefrom is supplied to the standby switching power circuit 52 via the primary coil 64 of the transformer 101.

Further the AC current generated in the secondary coil 82 of the transformer 101 is supplied to the regulator 70 via the rectifying smoother consisting of the diode 116 and the capacitor 126, so that a source voltage Vcc of a predetermined value is supplied from the regulator 70 to the microcomputer 72, which is thereby held in its normal operating state.

When the microcomputer 72 is thus placed in its operating state, the control terminal 96 of the microcomputer 72 is turned to a high level, which is then supplied to the base of the transistor 141 to thereby switch on the same.

Consequently, the light emitting diode 58A of the photo coupler 58 sends light to the photo transistor 58B, which is then switched on by the received light, so that the base of the transistor 142 is changed from a high level to a low level.

If the power switch 54 is turned on in this state, the power from the secondary coil 66 is supplied to cause conduction of the emitter-collector of the transistor 142, whereby a current flow is induced in the relay control coil 60 to eventually turn on the relay switch 46.

Then the commercial power obtained through the power plug 32 is supplied to the second rectifying smoother 48. The DC output from the second rectifying smoother is supplied to the main switching circuit to thereby actuate the main switching power circuit 50, so that the main power output 99 is delivered to the secondary circuit 36 via the transformer 102.

When the power switch 54 is turned on, a current is caused to flow in the light emitting diode 56A of the photo coupler 56 via the resistor 133, so that the light from the light emitting diode 56A reaches the photo transistor 56B to switch on the same, whereby the power switch on/off detection terminal 97 of the microcomputer 72 is changed from a high level to a low level.

That is, the power switch on/off detection signal SD is changed from a high level to a low level.

Consequently, the microcomputer 72 can detect that the power switch 54 is in its on-state.

Meanwhile the control terminal 96 of the microcomputer 72 is held at a high level to thereby maintain the main switching power circuit 50 in its operating state.

Next, when the power switch 54 is turned off, no power is supplied to the relay control coil 60, so that the relay switch 46 is turned off to thereby stop the operation of the main switching power circuit 50.

Since no current is supplied to the light emitting diode 56A of the photo coupler 56 either, the photo transistor 56B is turned off, and then a high-level signal is inputted to the power switch on/off detection terminal 97 of the microcomputer 72.

Thus, the microcomputer 72 can detect that the power switch 54 is in its off-state.

In case a standby command is outputted from a remote commander or the like when the power switch 54 is in its on-state and the main switching power circuit 50 is in operation, a low-level control signal CS is supplied from the control terminal 96 of the microcomputer 72 to the base of the transistor 141.

Consequently, the transistor 141 is turned off to cause no more current flow in the light emitting diode 58A of the photo coupler 58, so that the light emitting diode 58A is turned off.

As a result, the transistor 142 is turned off, and no more current is supplied to the relay control coil 60 to eventually turn off the relay switch 46, thereby stopping the operation of the main switching power circuit 50.

The feature of the present invention will now be described below.

In the power supply circuit 30 of the present invention shown in FIG. 2, both the relay switch 46 and the relay controller 94 including the relay control coil 60 are disposed in the primary circuit 34, differently from the conventional circuit known heretofore.

Due to such a different configuration, there exists no necessity of caring the spurious radiation noise emitted from the secondary circuit 36, and no portion of the secondary circuit 36 positionally enters the primary circuit 34, hence realizing diminution of the spurious radiation noise and dimensional reduction of the substrate area.

The photo couplers 56 and 58 have a function of electromagnetically insulating the primary circuit 34 and the secondary circuit 36 from each other, thereby enhancing the electromagnetic insulation between the primary circuit 34 and the secondary circuit 36.

The microcomputer 72 is capable of performing control from the secondary circuit 36 to the primary circuit 34 via the photo coupler 58 by the control signal CS obtained from the control terminal 96.

The microcomputer 72 constitutes a power control system wherein the on/off state of the power switch 54 in the primary circuit 34 can be recognized in accordance with the power switch on/off detection signal SD outputted from the photo coupler 56.

Figure 3:
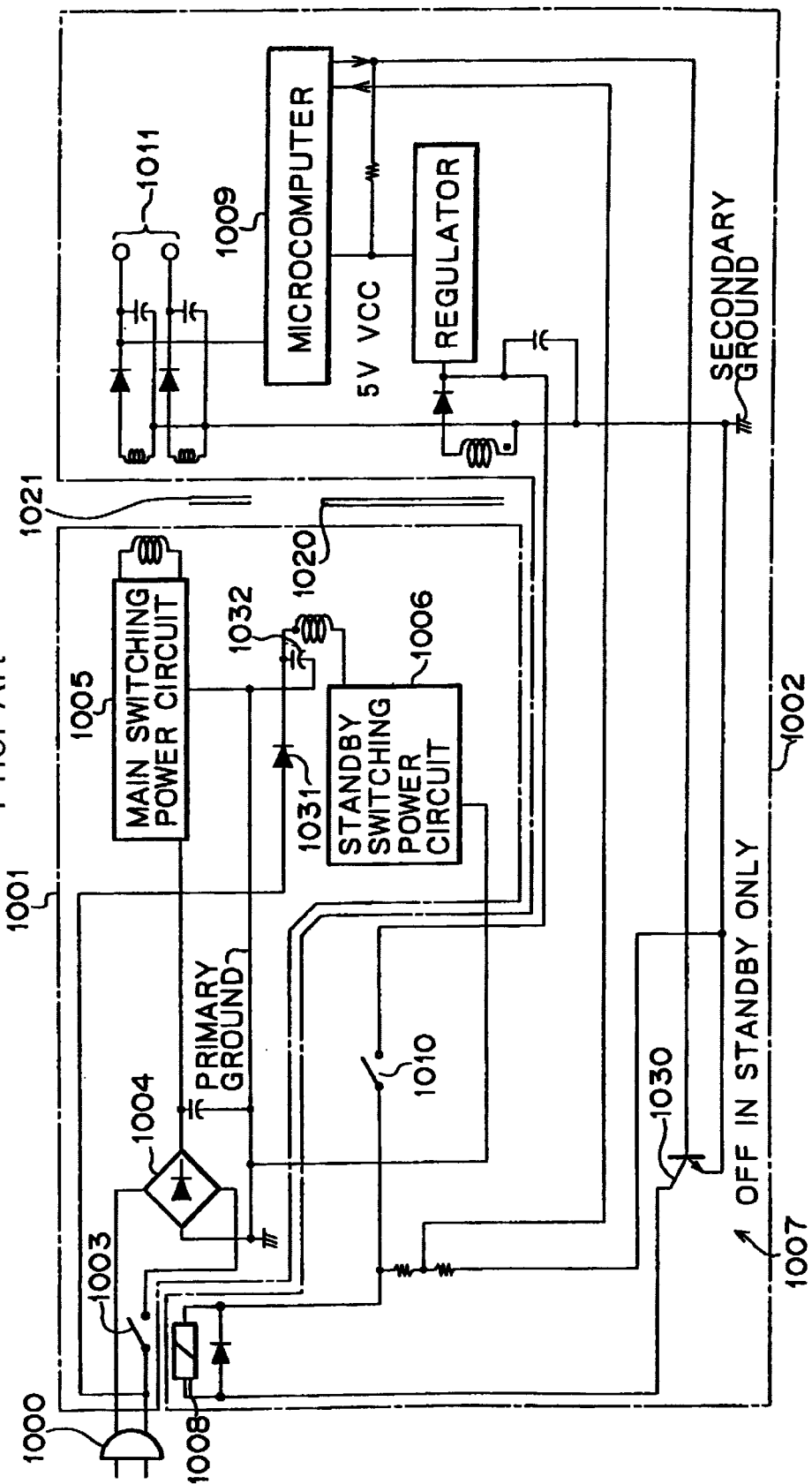
FIG. 3 is a circuit diagram of a known power supply circuit according to the related art.

In the conventional example of FIG. 3, the clearance and creeping distance between the relay switch 1003 in the primary circuit 1001 and the relay control coil 1008 in the secondary circuit 1002 is required to be more than 6 mm according to the safety standards in Europe and some areas of Asia where the commercial AC supply voltage is 220 V, or more than 3 mm according to the safety standards in U.S.A. where the commercial AC supply voltage is 120 V, or more than 3 mm according to the safety standards in Japan where the commercial AC supply voltage is 100 V.

Otherwise it is necessary to employ, for the relay switch 1003 and the relay control coil 1008, a requisite insulating structure (with regard to, e.g., material, thickness, dielectric strength, and non-flammability) prescribed in the safety standards.

In the present invention where the relay control coil 60 and the relay switch 46 are both disposed in the primary circuit, the predetermined clearance and creeping distance is not needed between the primary and secondary circuits as viewed from the safety standards, and the known insulating structure is not needed either, whereby the inter-terminal and inter-pattern distances can be shortened.

Consequently, the degree of freedom is raised in disposing the relay 92 and designing the patterns on the substrate, hence reducing the required area of the substrate.

In the conventional case where the relay controller is formed in the secondary circuit, it is necessary to ensure a sufficient distance between the patterns so as to diminish the level of the spurious radiation noise. Further, a certain insulation distance is needed since the secondary circuit partially enters the primary circuit. As a result, it has been difficult heretofore to attain effective use of the substrate area.

However, in the present invention where both of the relay switch 46 and the relay controller 94 can be disposed in the same primary circuit, it becomes possible to reduce the the substrate area. And the spurious radiation noise from the secondary circuit to the primary circuit can be sharply diminished.

According to the present invention, the microcomputer 72 is capable of detecting a power fault mode. That is, if the output of the standby switching power circuit 52 is existent, the microcomputer 72 can judge that the power plug 32 is in connection to the commercial AC power source 44.

And if the output of the main switching power circuit 50 is not existent, i.e., if the information signal IS is not fed to the output voltage detection terminal 95 of the microcomputer 72 via the signal line 100 of the secondary circuit 36 even after the control signal CS from the control terminal 96 is turned to a high level during recognition of the on-state of the power switch 54, then the microcomputer 72 can judge that the main switching power circuit 50 is abnormal.

Thus, it is possible in the microcomputer 72 to detect whether the main switching power circuit 50 is normal or abnormal.

It is further possible to reset the power supply circuit due to malfunction thereof. More specifically, when the main power circuit is kept at a halt by the operation of a protection circuit, the main switching power circuit 50 can be reset from its malfunction when restarted by changing the output level of the control signal CS, which is obtained from the control terminal 96 of the microcomputer 72, as high/low/high.

In case the main switching power circuit 50 fails to be restarted, the microcomputer 72 judges that the main switching power circuit 50 is not restartable for its proper operation. In this case, such abnormal state can be indicated by blinking the light emitting diode (LED) under control of the microcomputer 72.

As for a measure against lightning surge to the relay, there is no necessity of considering dielectric breakdown of the primary circuit 34 and the secondary circuit 36. Because, in regard of the relay 92, both the relay switch 46 and the relay control coil 60 are in the primary circuit, so that the known insulation structure required between the primary and secondary circuits in view of safety standards is not necessary. That is, a down-sized relay is usable to consequently curtail the cost.

Further, none of overvoltage is induced in the coil by any surge between the primary and secondary circuits.

The power switch (for the main power circuit) needs to meet merely the requirements for small signal, and any AC power supply standards is not necessary to eventually achieve down-sizing and cost reduction.

Since none of AC power switch is employed, there exists no extended layout of the AC power supply line due to a harness, so that the radiation noise or the like can be diminished with advantages of down-sizing the structure and curtailing the production cost.

It is to be understood that the present invention is not limited only to the above embodiments alone, and the power supply circuit of the invention may be used for some other kind of electronic apparatus than the projector mentioned.

What is claimed is:

1. A power supply circuit for converting an AC voltage of an input AC power into a desired DC output voltage, comprising:
    a first rectifying smoother for generating a DC voltage from said AC power supplied thereto;
    a standby power source supplied with said DC voltage from said first rectifying smoother and having a plurality of DC outputs;
    a second rectifying smoother for converting said AC voltage into a DC voltage;
    a main power source for converting the DC voltage of said second rectifying smoother into said desired DC output voltage;
    a main switch for actuating said main power source, electrically coupled with said primary side of said main power source and said standby power source;
    a relay controller disposed on the primary side of said main power source and said standby power source and, in response to actuation of said main switch, said relay controller is actuated by the first of the plural DC outputs obtained from said standby power source; and
    a relay switch disposed on the primary side of said main power source and said standby power source and, upon actuation of said relay controller, said relay switch is driven to connect said second rectifying smoother to said AC power source.

2. The power supply circuit according to claim 1 further comprising a control means disposed on the secondary side of said main power source and said standby power source, said control means being fed with an input signal which indicates an on-state or an off-sate of said main switch while maintaining electrical insulation between the primary side of said main power source and said standby power source and said control means, wherein said standby power source supplies the second of the plural DC outputs as a voltage for actuating said control means.

3. The power supply according to claim 2 further comprising a first optical switch, consisting of a light emitting element and a light receiving element to receive the light from said light emitting element, for transmitting said input signal to said control means;
    wherein said first optical switch is an electromagnetically insulating element disposed between the primary side of said main power source and said standby power source and the secondary side of said main power source and said standby power source.

4. The power supply circuit according to claim 3 wherein said relay controller has a relay control coil and receives a control signal from said control means, and when said main switch is actuated, said relay controller operates the relay control coil thereof to actuate said relay switch, said control means maintaining electrical insulation from said main power source and said standby power source.

5. The power supply circuit according to claim 4, further comprising a second optical switch, consisting of a light emitting element and a light receiving element to receive the light from said light emitting element, for transmitting said control signal from said control means;
    wherein said second optical switch is an electromagnetically insulating element disposed between the primary side of said main power source and said standby power source and the secondary side of said main power source and said standby power source.

6. The power supply circuit according to claim 5, wherein said control means has an input terminal to detect the DC output of said main power source, and is capable of discriminating between the absence and presence of the DC output of said main power source.

7. The power supply circuit according to claim 6, wherein each of said first and second optical switches is a photo coupler.

* * * * *